United States Patent
Adamson et al.

(10) Patent No.: US 12,286,879 B2
(45) Date of Patent: Apr. 29, 2025

(54) OIL FIELD CHEMICAL RELEASE SYSTEM

(71) Applicant: TRACERCO LIMITED, London (GB)

(72) Inventors: Lauren Adamson, Cleveland (GB); Chun-tian Zhao, Cleveland (GB); Karen Waterman, Cleveland (GB)

(73) Assignee: TRACERCO LIMITED, London (GB)

( * ) Notice: Subject to any disclaimer, the term of this patent is extended or adjusted under 35 U.S.C. 154(b) by 228 days.

(21) Appl. No.: 17/759,317

(22) PCT Filed: Feb. 11, 2021

(86) PCT No.: PCT/GB2021/050337
§ 371 (c)(1),
(2) Date: Jul. 22, 2022

(87) PCT Pub. No.: WO2021/219973
PCT Pub. Date: Nov. 4, 2021

(65) Prior Publication Data
US 2023/0117956 A1    Apr. 20, 2023

(30) Foreign Application Priority Data

Apr. 30, 2020 (GB) ..................................... 2006357
Jul. 3, 2020 (GB) ..................................... 2010201

(51) Int. Cl.
*E21B 47/11*    (2012.01)

(52) U.S. Cl.
CPC .................................. *E21B 47/11* (2020.05)

(58) Field of Classification Search
CPC ......... E21B 47/11; E21B 43/267; C09K 8/52; C09K 8/92; C09K 8/035; C09K 8/536; C09K 8/70; C09K 8/706
See application file for complete search history.

(56) References Cited

U.S. PATENT DOCUMENTS

| | | | |
|---|---|---|---|
| 4,908,209 A * | 3/1990 | McIntosh, Jr. | D06M 16/00 424/419 |
| 5,892,147 A | 4/1999 | Garnes et al. | |
| 2002/0031717 A1* | 3/2002 | Ray | B41C 1/1008 430/300 |
| 2018/0298277 A1* | 10/2018 | Borrell | E21B 47/11 |

FOREIGN PATENT DOCUMENTS

| | | |
|---|---|---|
| WO | 2001081914 | 11/2001 |
| WO | 2013/009895 A1 | 1/2013 |
| WO | 2016/174413 A1 | 11/2016 |
| WO | 2019/058099 A1 | 3/2019 |
| WO | 2019/243810 A1 | 12/2019 |

OTHER PUBLICATIONS

L.C. Correa-Filho et al., Advances in the Application of Microcapsules as Carriers of Functional Compounds for Food Products, Applied Sciences, (2019) 9, 571.

\* cited by examiner

*Primary Examiner* — Kumar R Bhushan
(74) *Attorney, Agent, or Firm* — BakerHostetler

(57) ABSTRACT

An oil field chemical release system for controlled release of an oil field chemical within a hydrocarbon reservoir, well, or wellbore, the oil field chemical release system comprising: a plurality of microcapsules, each microcapsule comprising an oil field chemical and a microencapsulant, wherein the oil field chemical is contained within the microencapsulant; and a continuous bulk polymer matrix, wherein the plurality of microcapsules are disposed within the continuous bulk polymer matrix, wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate, and wherein the oil field chemical release system is configured to provide a release profile.

17 Claims, 10 Drawing Sheets

(a)

(b)

OIL FIELD CHEMICAL RELEASE SYSTEM

FIELD

The present specification relates to oil field chemical release systems for controlled release of oil field chemicals within a hydrocarbon reservoir, well, or wellbore.

BACKGROUND

It is common practice to deliver oilfield chemicals to a subterranean hydrocarbon reservoir, well, or wellbore to bring about a variety of functions at various stages of hydrocarbon production. Examples of oil field chemicals are scale inhibitors, hydrate inhibitors, corrosion inhibitors, biocides, and wax and asphaltene control substances.

Oilfield fluids are complex mixtures of aliphatic hydrocarbons, aromatics, hetero atomic molecules, anionic and cationic salts, acids, sands, silts, clays and a vast array of other components. The nature of these fluids, combined with the severe conditions of heat, pressure, and turbulence to which they are often subjected during retrieval, are contributory factors to scale build-up, paraffin deposition (including the precipitation of wax crystals), emulsification (both water in oil and oil in water), gas hydrate formation, corrosion and asphaltene precipitation in oil and/or gas production wells and surface equipment. This, in turn, decreases permeability of the subterranean formation, reduces well productivity, and shortens the lifetime of production equipment. In order to remove such unwanted deposits and precipitates from wells and equipment, it is necessary to stop the production which is both time consuming and costly.

Further examples of oil field chemicals are thickeners and gel breakers used in hydraulic fracturing. Hydraulic fracturing is a well-established technique for stimulating production from a hydrocarbon reservoir. In a fracturing procedure, a thickened aqueous fracturing fluid can be pumped into the reservoir formation through a wellbore and opens a fracture in the formation. Thickened fluid is then also used to carry a particulate proppant into the fracture. Once the fracture has been made and packed with proppant, pumping is stopped. The formation closes onto the proppant pack and oil or gas can flow through the proppant pack to the wellbore. At least some of the aqueous fracturing fluid used during hydraulic fracturing operations will be driven back to the surface with fluid produced from the reservoir. The fracturing fluid is subsequently pumped out and disposed of, and the hydrocarbons that are produced are retained. A thickener, which increases the viscosity of the fracturing fluid, can be a polysaccharide. Guar gum, often cross linked with borate or a zirconium compound, is frequently used. Another category of thickeners is viscoelastic surfactants. An oilfield chemical can be delivered to a reservoir during fracturing. If the fracturing fluid contains a viscosifying thickener, it is normal to supply a so called breaker (which is usually an oxidizing agent, an acid or an enzyme) into the fracture to degrade the thickener and so reduce the viscosity of the fluid in the fracture after it has served its purpose. This facilitates the flow back to the surface and the flow of produced fluid through the proppant pack towards the wellbore. In the interest of completeness, it may be noted that not all fracturing fluids use a thickener or component that adds viscosity. Slickwaters use chemicals to reduce friction and act as a surfactant, ideally without adding viscosity. Traditionally, slickwater fracturing fluids do not use a breaker.

In certain cases, the chemical delivery isn't to treat the reservoir, but rather to treat the well/wellbore itself. For example, if there is unwanted deposition within well tubulars, a chemical pickle may be used to re-solubilize the deposited materials. Similarly, issues with screen plugging, poor cement bonds/cracking around the well, etc. can be treated using oil field chemicals.

A further example of an oil field chemical is a chemical tracer used for monitoring of hydrocarbon reservoirs. Optimal oil and gas production from the reservoir depends upon reliable knowledge of the reservoir characteristics. Traditional methods for reservoir monitoring include seismic log interpretation, well pressure testing, production fluid analysis, production history matching, and interwell, near wellbore, and wellbore tracer techniques. Due to the complexity of the reservoir, all information available is valuable in order to give the operator the best possible knowledge about the dynamics in the reservoir. One common secondary oil recovery process is fluid injection (e.g. water or gas injection) in dedicated injection wells. The fluid may travel in different layers and sweep (flow across) different areas in the reservoir. Monitoring of the production of this fluid in different zones in the well is important to design a production program that improves the sweep efficiency and thereby increase oil recovery. Mixing of injection fluid and formation water originally present in the reservoir may cause supersaturated solutions leading to precipitation of particles (scale) in either the reservoir near well zone or in the production tubing. By knowing which zone or zones contribute to water production, action can be taken to reduce the effect of scaling and thereby maintain productivity.

The use of tracers to obtain information about a hydrocarbon reservoir and/or about what is taking place therein has been practiced for several decades and has been described in numerous documents. Tracers have primarily been used to monitor fluid paths and velocities. More than one tracer substance can be used concurrently. For instance, U.S. Pat. No. 5,892,147 discloses a procedure in which different tracers are placed at respective locations along the length of a well penetrating a reservoir. The tracers are placed at these locations during completion of the well before production begins. The tracer at each location is either attached to a section of pipe before it is placed at that location or is delivered into the location while perforating casing at that location. When production begins, monitoring the proportions of the individual tracers in the oil or gas produced by the well allows calculation of the proportions of oil or gas being produced from different zones of the reservoir.

Tracers have been used in connection with hydraulic fracturing, mainly to provide information on the location and orientation of the fracture. Tracers can also be used for estimating residual oil saturation. Tracers have been used in single well tests and in interwell tests. In single well tests, a tracer is injected into the formation from a well and then produced out of the same well mixed with fluids from the well. The delay in time needed to return to the surface between a tracer that does not react with the formation (a conservative tracer) and one that does (a partitioning tracer) will give an indication of residual oil saturation, a piece of information that is difficult to acquire by other means. In interwell tests, the tracer is injected at one well along with a carrier fluid, such as water in a waterflood, and detected at a producing well after some period of time, which can range from days to years.

Radioactive and chemical tracers have been used extensively in the oil industry and hydrology testing for decades.

Non-radioactive chemical tracers offer distinct advantages over the use of radioactive tracers. For example, there are more unique chemical tracers than radioactive tracers and no downhole logging tools are required.

Oilfield chemicals are normally formulated with adjuvant or carrier chemicals before being introduced into a reservoir. When the formulated material is a liquid, the liquid can be pumped down a wellbore to the reservoir. When the formulated material is a solid, it can be pre-placed onto equipment, such as the well bore, before the equipment is placed in the well. Oil field chemicals may be absorbed into the pores of porous carrier particles or encapsulated in a structure in which the oilfield chemical is enclosed, e.g. within a shell of carrier material around the oil field chemical. Such particles containing oil field chemicals can then be suspended in a fluid and pumped downhole into the reservoir.

Despite the very wide usage of oil field chemicals, many of the current methods of introducing and using these chemicals have disadvantages.

One issue is the difficulty in handling oilfield chemicals that are in different physical states. For example, when different tracers are placed at their respective locations along the length of a well penetrating a reservoir, a stable solid form of a tracer formulation is normally used. Compared to solid tracers, tracers in liquid and gas form are often difficult to formulate and shape into stable solid objects. This can limit the types of tracers that can be used.

Another issue is that some oil field chemicals are reactive, making them difficult to formulate and deliver into the reservoir.

A further issue is that unwanted inhomogeneous (non-homogeneous) compositions can result from formulating some oil field chemicals. This is found when attempting to formulate different tracers with polymers to form objects for application to hydrocarbon reservoirs. Tracers can differ from each other with respect to a variety of properties, such as density, particle size, and in various surface related properties. These differences can be very significant. For example, the density of oil tracers can vary (e.g. from 1 to 3 $g/cm^3$) and these differences can result in various problems. The differences between the densities of the tracers can result in compositions comprising a tracer and polymer having significant non-homogeneous structure and morphology. High density tracers tend to settle during the formulation process used to form the tracers into objects. Such non-homogeneous objects tend to show undesired release behaviour in a subterranean reservoir environment. Although the use of an extra dispersing/stabilizing additive in the formulation of the objects can partially alleviate this problem, other associated problems, such as poor mechanical strength in a reservoir environment, remain. As a result, sometimes even apparently similar tracers in one family cannot be formulated in the same way.

One of the most important issues is the release of oil field chemicals from formulated articles to the targeted fluid or reservoir areas. While it is often a requirement for oil field chemicals to be released in a sustained manner, e.g. slowly so that treatment can be effective over long periods of time (e.g., years), the release of the chemicals in current commercial practice is often too fast (less than 6 months) and not up to the needs of the industry. As a result, some oil field chemicals have to be repeatedly introduced into wells to ensure that the requisite level of the well treatment agent is continuously present in the well. The release of oil field chemicals, such as tracers, is often not controlled in current practice, causing significant variations over time for both a single tracer and between different tracers. Such issues often result in ineffective treatments or loss of monitoring of the reservoir, result in lost production revenue due to down time, and increase costs resulting from the requirement for additional materials to retreat the wells.

There are numerous publications describing either: chemical tracer-based reservoir monitoring; and/or oil field chemical delivery for reservoir treatment. For example, WO2001081914 discloses a method of monitoring hydrocarbon and water production from different production zones/sections. Tracer chemicals are covalently linked or linked by ionic interactions to polymers, and the tracers can also be contained in a polymer matrix. The tracers are thus immobilized by means of at least one polymer capable of adhering to the formation, the tracers being covalently bonded or bonded by ionic interactions to the polymer.

More recently, an improved oilfield chemical release technology has been described by the present applicant in WO2016174413. This document describes an oil field chemical release system for reservoir treatment or monitoring comprising: (a) microcapsules comprising an oil field chemical and a microencapsulant, wherein the oil field chemical is contained within the microcapsules; and (b) a bulk polymer, where the microcapsules are embedded within the bulk polymer. The use of microcapsules of oil field chemicals within a bulk polymer matrix has been found to provide two main advantages:

(i) Microencapsulation enables a controlled and uniform physical and chemical interface to be provided for a range of different oil field chemicals. This can make it much easier to process a range of oil field chemicals into bulk polymer structures and/or enable an oil field chemical to be immobilized in a bulk polymer structure which would otherwise not be feasible. A range of different types of oil field chemicals can be fabricated into microcapsules of the same or similar physical and chemical form. These intermediate granular products can then more readily be processed in the same or similar manner to embed the oil field chemicals into bulk polymer structures without requiring direct physical and chemical compatibility between the oil field chemicals themselves and the bulk polymer. Variations in chemistry, density, hydrophilicity, phase, etc. of the oil field chemicals can be negated when formulating the microencapsulated oil field chemicals into polymer release systems. This enables a range of different, and otherwise incompatible materials, to be combined and provides a more uniform and/or controlled distribution of oil field chemical through a bulk polymer matrix.

(ii) It has been found that microencapsulating the oil field chemicals and then incorporating the microencapsulated oil field chemicals into a bulk poly matrix enables a more controlled release of the oil field chemicals compared to a configuration in which the oil field chemicals are incorporated directly into a bulk polymer matrix. The microcapsules remain embedded within the bulk polymer during use and the oil field chemical is required to move through both the microencapsulant and the surrounding bulk polymer prior to reaching the surface of the bulk polymer and being released into the surround fluid in the reservoir. The combination of microencapsulant and bulk polymer has been found to enable an improvement in the controlled release of oil field chemicals, particularly over extended time periods within a hydrocarbon reservoir.

That said, there is an ongoing need to provide improved oil field chemical release systems which provide a controlled release of a range of oil field chemicals at desired concentrations, locations, time periods, release rates, and in varying environments to treat and monitor reservoir systems over extended time periods.

SUMMARY

The present specification builds on the combined microencapsulation/bulk polymer technology described in applicant's earlier WO2016174413 publication. In particular, the present inventors have found that by selecting suitable combinations of materials and structures, the release profile of oil field chemicals can be optimized for different application environments/requirements, e.g. hydrocarbon reservoirs of different temperature. In this regard, the basic oil field chemical—microencapsulant—bulk polymer release system described in WO2016174413 has been further developed and optimized for end applications. This oil field chemical release system provides a complex multi-dimensional parameter space formed by variables including: oil field chemical type; oil field chemical quantity/concentration within the microencapsulant; microencapsulant type; microencapsulant/micro-shell thickness; microcapsule size; bulk polymer type; bulk polymer size/shape; and microencapsulant concentration/distribution within the bulk polymer. It has been found that combinations of these parameters can be selected to provide optimized release profiles for particular end use requirements such as hydrocarbon reservoir locations with different temperatures, pressures, chemistries, flow rates, hydrocarbon content, water content, etc. Such a controlled release profile over extended time periods has proved difficult or impossible using a bulk polymer alone.

In particular, the present specification provides an oil field chemical release system for controlled release of an oil field chemical within a hydrocarbon reservoir, well, or wellbore, the oil field chemical release system comprising:
  a plurality of microcapsules, each microcapsule comprising an oil field chemical and a microencapsulant, wherein the oil field chemical is contained within the microencapsulant; and
  a continuous bulk polymer matrix, wherein the plurality of microcapsules are disposed within the continuous bulk polymer matrix,
  wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate, and
  wherein the oil field chemical release system is configured to provide a release profile, calculated as a weight percentage of an initial oil field chemical content of the chemical release system, in a range 0.01 to 8.3 wt % per month for a time period of at least 1 year at a target temperature in a range −45° C. to 300° C.

The release profile of the oil field chemical may further be in a range: 0.01 to 4.2 wt % per month for a time period of at least 2 years; 0.01 to 2.8 wt % per month for a time period of at least 3 years; 0.01 to 1.7 wt % per month for a time period of at least 5 years; 0.01 to 1.2 wt % per month for a time period of at least 7 years; or 0.01 to 0.8 wt % per month for a time period of at least 10 years. Further still, the release profile of the oil field chemical may be at least 0.05, 0.1, 0.2, 0.5, 0.7, or 0.8 wt % per month. Furthermore, the target temperature may be in a range 0° C. to 250° C., 20° C. to 200° C., 50° C. to 150° C., 60° C. to 120° C., or one of 60° C., 90° C., or 120° C.

As previously indicated, the oil field chemical—microencapsulant—bulk polymer release system provides a complex multi-dimensional parameter space of interrelated parameters. Different combinations of parameter selections can in principle achieve the same functional performance. For example, certain encapsulating materials are less permeable for a particular oil field chemical and thus a thinner encapsulating coating will achieve the same or similar release rate from the microcapsules into the bulk polymer compared to a thicker encapsulating layer of more permeable encapsulating material. Similarly, the relative permeability of the bulk polymer and the encapsulating material can be controlled to achieve the desired release rate of oil field polymer from the external bulk polymer surface. Accordingly, it will be apparent that there are a number of different ways to achieve the functional result of the present invention and that it is not appropriate to define the present invention in terms of only one specific combination of material and structural parameters. Rather, the present invention lies in the finding that the material and structural parameters of an oil field chemical—microencapsulant—bulk polymer release system can be tuned to achieve a controlled release rate over an extended time period at a number of different temperatures so as to achieve the release profile as specified above.

Advantageously, the continuous bulk polymer matrix comprises at least two different monomers which are chemically bonded to form a co-polymer or provided as a blend of at least two different polymers. This configuration has been found to be advantageous for use in combination with microcapsules of oil field chemical, as the release profile of the same microencapsulated oil field chemical can be tuned to provide a specified release profile at a specified temperature by changing the ratio of the different monomers/polymers in the bulk polymer matrix in which the microcapsules of oil field chemical are disposed. That is, a common process for fabricating microcapsules of oil field chemical can be utilized to provide a common microencapsulated oil field chemical as an intermediate product. This common intermediate product can then be processed into different bulk polymer matrix compositions to achieve different release profiles at a given temperature, or, more usefully, the same or a similar release profile at different operating temperatures in use. As such, in certain examples the composition of the bulk polymer matrix is varied to achieve a desired release profile at a specified temperature while keeping the microcapsule composition and structure fixed. Incorporating an oil field chemical directly into the bulk polymer matrix and varying the composition of the bulk polymer matrix was unsuccessful at achieving the specified release profiles. However, surprisingly, it has been found that using a microencapsulated oil field chemical it is then possible to tune the composition of a surrounding bulk polymer matrix in order to achieve the desired release profile at a specified target temperature.

Following on from the above, the present specification provides a set of at least two, and preferably at least three or more, oil field chemical release systems as previously defined. Each oil field chemical release system contains the same oil field chemical but has a different combination of microencapsulant and bulk polymer matrix such that each oil field chemical release system provides a release profile as previously specified but at different temperatures. For example, one system may be tuned to provide the release profile at 60° C., one system may be tuned to provide the release profile at 90° C., and one system may be tuned to provide the release profile at 120° C. As previously indicated, this can be achieved, for example, using the same encapsulant and varying the composition of the bulk polymer matrix, e.g. by using a polymer matrix comprising at least two different monomers/polymers and varying the ratio of those monomers/polymers.

Additionally, or alternatively, the microencapsulant may be a polymeric microencapsulant and may also comprise at least two different monomers which are chemically bonded to form a co-polymer or provided as a blend of at least two different polymers. As with the bulk polymer, the use of two different monomers can be advantageous to tune the release profile of the system without changing the basic chemistry of the system. This is useful to retain chemical compatibility between the encapsulant and the bulk polymer while retaining the flexibility to tune the release profile.

While it has been found that the combination of microencapsulation in combination with the use of a multi-component bulk polymer system is advantageous for achieving long and controlled release profiles as previously defined, it is also envisaged that such systems can also be used for controlled release of oil field chemicals over a different, e.g. shorter, elution time period if that is what is required in a particular application. As such, according to another aspect of the technology described herein, there is provided an oil field chemical release system for controlled release of an oil field chemical within a hydrocarbon reservoir, well, or wellbore, the oil field chemical release system comprising:
  a plurality of microcapsules, each microcapsule comprising an oil field chemical and a polymer microencapsulant, wherein the oil field chemical is contained within the microencapsulant; and
  a continuous bulk polymer matrix, wherein the plurality of microcapsules are disposed within the continuous bulk polymer matrix,
  wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate, and
  wherein one or both of the polymer microencapsulant and the continuous bulk polymer matrix comprise at least two different monomers which are chemically bonded to form a co-polymer or provided as a blend of at least two different polymers.

In such systems, a ratio of the monomers or polymers is tuned to provide a target release rate at a target temperature. This release rate may correspond to the release profile as previously defined but could be a faster release rate over a shorter time period if that is desired for a particular application.

It is also envisaged that more than one type of microcapsule can be incorporated into the same bulk polymer matrix to provide an additional degree of freedom to control the release rate of one or more oil field chemicals. For example, the type of oil field chemical, the wall thickness of the microcapsules and/or the chemical composition of the microcapsule walls may be varied to provide a variation in the release of oil field chemicals from the microcapsules into the surrounding bulk polymer and subsequently into the surrounding environment. In certain configurations, the microcapsules may contain the same oil field chemical, but the wall thickness or chemical composition of the microcapsules is varied to vary the release rate of the oil field chemical, e.g. a sub-set of microcapsules may have a thinner wall for a faster release of the oil field chemical and another sub-set of microcapsules may have a thicker wall for a slower release rate of the oil field chemical. In this way, the short-term and long-term elution rate of the oil field chemical can be tailored as desired. Thus, according to another aspect of the technology described herein, there is provided an oil field chemical release system for controlled release of an oil field chemical within a hydrocarbon reservoir, well, or wellbore, the oil field chemical release system comprising:
  a plurality of first and second microcapsules, each microcapsule comprising an oil field chemical and a polymer microencapsulant, wherein the oil field chemical is contained within the microencapsulant, and wherein the first and second microcapsules differ in terms of their oil field chemical, microcapsule wall thickness, and/or microcapsule wall composition; and
  a continuous bulk polymer matrix, wherein the plurality of microcapsules are disposed within the continuous bulk polymer matrix, and
  wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate.

Further still, it is also envisaged that for certain applications, particularly those which do not require long elution times, the use of a multi-component bulk polymer system, such as a multi-component epoxy resin system, is envisaged without the requirement to use microencapsulation. As such, according to another aspect of the technology described herein, there is provided an oil field chemical release system for controlled release of an oil field chemical within a hydrocarbon reservoir, well, or wellbore, the oil field chemical release system comprising:
  an oil field chemical; and
  a continuous bulk polymer matrix, wherein the oil field chemical is disposed within the continuous bulk polymer matrix,
  wherein the oil field chemical release system is configured to allow the oil field chemical to move through the continuous bulk polymer matrix to be released through a surface of the bulk polymer matrix into the hydrocarbon reservoir, well, or wellbore at a controlled rate, and
  wherein the continuous bulk polymer matrix comprises at least two different monomers which are chemically bonded to form a co-polymer or provided as a blend of at least two different polymers.

In such systems, a ratio of the monomers or polymers is tuned to provide a target release rate at a target temperature. Such systems which do not use microencapsulated oil field chemical typically provide a faster release rate over a shorter time period.

BRIEF DESCRIPTION OF THE DRAWINGS

For a better understanding of the present invention and to show how the same may be carried into effect, certain embodiments of the present invention will now be described by way of example only with reference to the accompanying drawings, in which.

DETAILED DESCRIPTION

Figure 1:
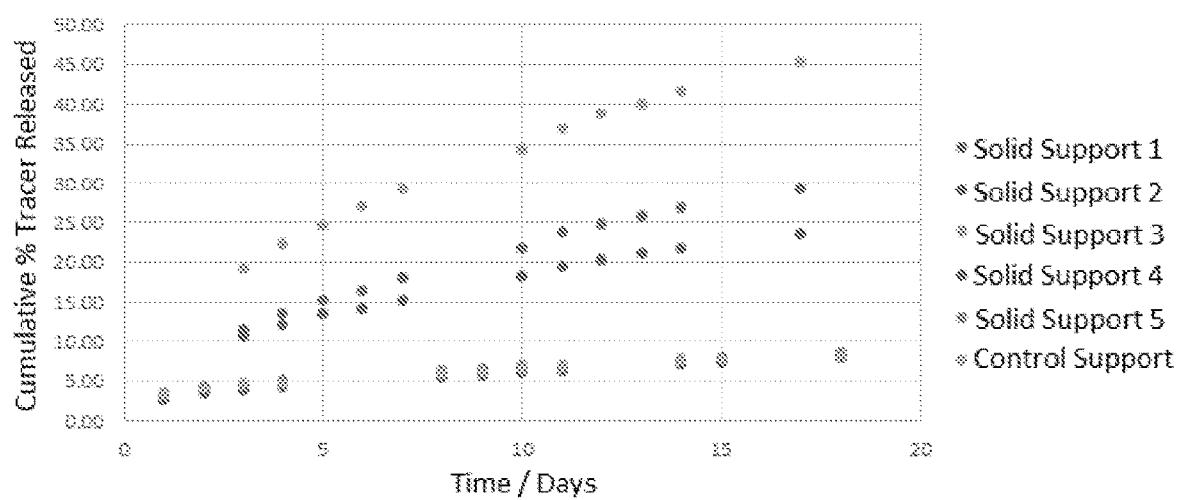
FIG. 1 shows oil field chemical release profiles for non-encapsulated oil field chemicals which have been directly incorporated into various different bulk polymer compositions indicating that that significant quantities of oil field chemical are released within the first 15 to 20 days without the use of microencapsulation in combination with a bulk polymer matrix.

As described in the summary section, the present specification provides an oil field chemical release system for controlled release of an oil field chemical within a hydrocarbon reservoir, well, or wellbore, the oil field chemical release system comprising:
a plurality of microcapsules, each microcapsule comprising an oil field chemical and a microencapsulant, wherein the oil field chemical is contained within the microencapsulant; and
a continuous bulk polymer matrix, wherein the plurality of microcapsules are disposed within the continuous bulk polymer matrix,
wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate, and
wherein the oil field chemical release system is configured to provide a release profile, calculated as a weight percentage of an initial oil field chemical content of the chemical release system, in a range 0.01 to 8.3 wt % per month for a time period of at least 1 year at a target temperature in a range −45° C. to 300° C.

In further examples, the release profile of the oil field chemical may be in a range: 0.01 to 4.2 wt % per month for a time period of at least 2 years; 0.01 to 2.8 wt % per month for a time period of at least 3 years; 0.01 to 1.7 wt % per month for a time period of at least 5 years; 0.01 to 1.2 wt % per month for a time period of at least 7 years; or 0.01 to 0.8 wt % per month for a time period of at least 10 years. Further still, the release profile of the oil field chemical may be at least 0.05, 0.1 0.2, 0.5, 0.7, or 0.8 wt % per month. Furthermore, the target temperature may be in a range 0° C. to 250° C., 20° C. to 200° C., 50° C. to 150° C., 60° C. to 120° C., or one of 60° C., 90° C., or 120° C.

The release profile can be measured by placing the release system in a container of oil or water. Selection of oil or water is based on whether the oil field chemical is oil or water soluble, e.g. whether the oil field chemical is an oil or water tracer for example. A suitable oil is a synthetic oil composed of 80% Transulate transformer oil (Smith & Allan) and 20% Downtherm Q oil (Dow) which can be used as a model crude oil to test the release performance of the sustained release systems. The container is heated to the target temperature (e.g. 60° C., 90° C., or 120° C.) with the release system disposed in the elution liquid and maintained at that temperature for a test period. The elution liquid may be stirred. Periodically, samples of the oil (or water) are removed and tested for the quantity of oil field chemical which has eluted from the release system. The most suitable analytical method used to determine the quantity of oil field chemical will depend on the nature of the oil field chemical. For certain tracer compounds gas chromatography—mass spectrometry or gas chromatography—electron capture detection may be used.

Fresh elution liquid can be introduced to replace fluid removed by sampling and/or the elution liquid can be replaced in its entity at various times during testing. The cumulative total of oil field chemical released from the release system can be readily calculated taking into account any replacement of fluid surrounding the release system. Since the amount of oil field chemical in the release system prior to testing is known (which can be determined, for example, by analysing a sample of the release system prior to release testing) then the release profile can be calculated as a weight percentage of an initial oil field chemical content of the chemical release system. The release systems as described herein are optimized to provide a release profile in a range 0.01 to 8.3 wt % per month for a time period of at least 1 year at a target temperature in a range −45° C. to 300° C.

The present invention lies in the finding that the material and structural parameters of an oil field chemical—microencapsulant—bulk polymer release system can be tuned to achieve a controlled release rate over an extended time period at a target temperature, or a number of different target temperatures, so as to achieve the release profiles as specified above.

It should be noted that in the release systems described herein the bulk polymer matrix remains intact during use, and the microcapsules remain embedded in the bulk polymer. The release mechanism for the oil field chemical is via release of the chemical through the encapsulant into the bulk polymer matrix and then via release of the chemical from the bulk polymer matrix into reservoir fluid. In this way, the oil field chemical is released in solution rather than as a solid particle.

As previously indicated, the continuous bulk polymer matrix may comprise at least two different monomers which are chemically bonded to form a co-polymer or provided as a blend of at least two different polymers. For example, the continuous bulk polymer matrix can be formed of an epoxy resin system comprising at least two different monomers. The polymer system may additionally comprise a curing or cross-linking agent in addition to the two different monomer units. This two-monomer bulk polymer configuration has been found to be advantageous for use in combination with microcapsules of oil field chemical, as the release profile of the same microencapsulated oil field chemical can be tuned to provide a specified release profile at a specified temperature by changing the ratio of the different monomers/polymers in the bulk polymer matrix in which the microcapsules of oil field chemical are disposed. As such, the composition of the bulk polymer matrix can be varied to achieve a desired release profile at a specified temperature while keeping the microcapsule composition and structure fixed.

The functional performance of the combined microcapsule and bulk polymer release systems as described herein is significantly different to release systems in which an oil field chemical is incorporated directly into a bulk polymer matrix, even if the composition of the bulk polymer matrix is varied in an attempt to control release of oil field chemicals over extended time periods. In this regard, FIG. 1 shows oil field chemical release profiles for non-encapsulated oil field chemicals which have been directly incorporated into various different bulk polymer compositions. In these systems, the solid support is a two-part polymer. An oil field chemical (e.g. a tracer) is dissolved in part 1 then cured by addition of part 2. Each tracer has a maximum solubility in part 1. Results indicate that significant quantities of oil field chemical are released within the first 15 to 20 days without the use of microencapsulation in combination with a bulk polymer matrix. While the initial surge of tracer release was found to vary with polymer composition, in all cases the tracer was released too quickly for long time scale tracing applications. As such, incorporating an oil field chemical directly into the bulk polymer matrix and varying the composition of the bulk polymer matrix was unsuccessful at achieving the specified long time period release profiles.

To improve upon the above results, a secondary coating was applied around the bulk polymer to create an additional barrier. However, the performance of such a dual layer product was not sufficiently improved to warrant continued investigation. Surprisingly, using microencapsulation within the bulk polymer, instead of a secondary coating around the bulk polymer, enables the initial surge of tracer to be eliminated and long and controlled release rates achievable. Such an approach can be similar to that described above using a two-part polymer. Solid or liquid tracers are incorporated into solid microcapsules prior to mixing with part 1 of the polymer formulation and cured by addition of part 2.

The microencapsulation can improve solubility in part 1 of the polymer system and also aid in controlling release rate to prevent the initial surge of tracer. The microencapsulation creates an additional physical barrier between the tracer (or other oil field chemical) and the solid support matrix and can significantly improve product performance.

Figure 2:
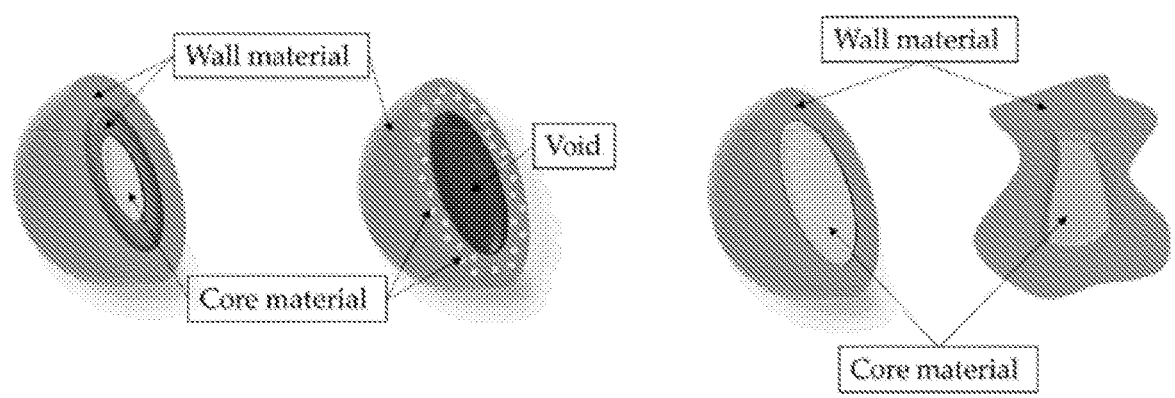
FIG. 2 shows the basic morphologies of microcapsules (from "Advances in the Application of Microcapsules as Carriers of Functional Compounds for Food Products," by L. C. Corrêa-Filho, M. Moldão-Martins, and V. D. Alves, 2019, Applied Sciences, 9(3), p. 572. )

FIG. 2 shows the basic morphologies of typical microcapsules (from "Advances in the Application of Microcapsules as Carriers of Functional Compounds for Food Products," by L. C. Corrêa-Filho, M. Moldão-Martins, and V. D. Alves, 2019, Applied Sciences, 9(3), p. 572. ). The microcapsules may have a diameter of: at least 50 nm, 500 nm, 1 micrometre, or 20 micrometres; no more than 2 mm, 1 mm, 500 micrometres, or 100 micrometres; or within a range defined by any one of the aforementioned lower and upper limits. The microcapsules typically comprise a core material surrounded by a material which is significantly different from that of the core. Microencapsulation technology is not new in other application spaces. Initial research into microencapsulation applications began in the 1930's and the first important industrial application was in carbonless copy paper (1953). Microencapsulation technology is also extensively used in the pharmaceutical industry so as to protect active pharmaceutical ingredients (APIs) from enzymatic degradation and control the release of the APIs. However, to the present applicant's knowledge, such microencapsulation technology has not been previously developed to achieve commercial products for use in the extreme environments of hydrocarbon reservoirs. Using microencapsulation, it is possible to control the rate at which tracers or other oil field chemicals elutes from the microcapsules by changing: wall material (e.g. polymers, waxes, polysaccharides, proteins, etc.); wall thickness (thicker walls=slower release); and microcapsule morphology.

Figure 3:
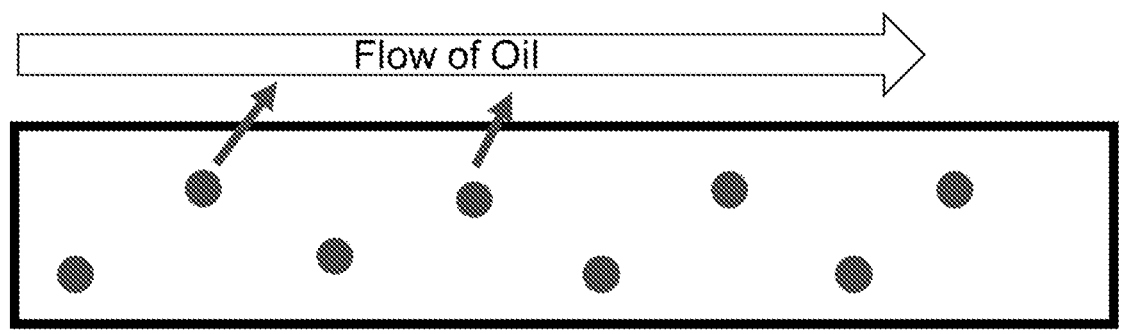
FIGS. 3(a) and 3(b) show schematic diagrams of (a) non-encapsulated and (b) microencapsulated oil field chemicals in a bulk polymer matrix with the non-encapsulated configuration exhibiting a 1-step process for release and the microencapsulated configuration exhibiting a 2-step process for release.
Figure 3:
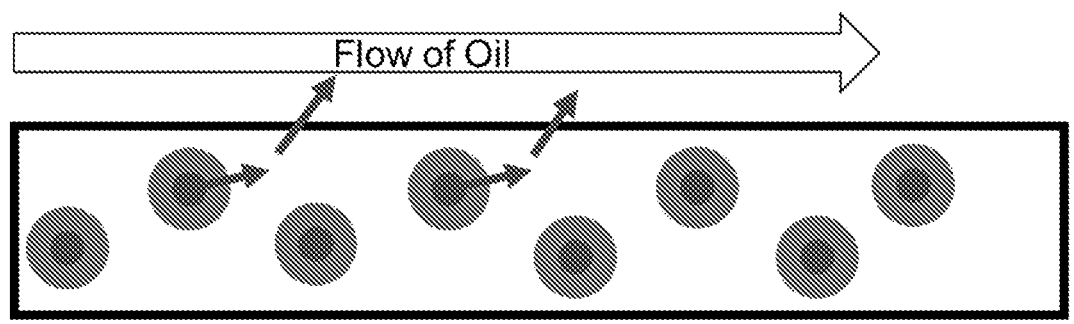

FIGS. 3(a) and 3(b) show schematic diagrams of (a) non-encapsulated and (b) microencapsulated oil field chemicals in a bulk polymer matrix with the non-encapsulated configuration exhibiting a 1-step process for release and the microencapsulated configuration exhibiting a 2-step process for release. The additional control provided by the 2-step release process has been found to be important in achieving long and controlled release profiles at elevated temperatures experienced in hydrocarbon reservoir environments.

Figure 4:
FIG. 4 shows a schematic illustrating different materials, thicknesses and morphologies for the microencapsulation.

FIG. 4 shows a schematic illustrating different materials, thicknesses and morphologies for the microencapsulation. The microencapsulant may be a polymeric microencapsulant and may also comprise at least two different monomers which are chemically bonded to form a co-polymer or provided as a blend of at least two different polymers. As with the bulk polymer, the use of two different monomers can be advantageous to tune the release profile of the system without changing the basic chemistry of the system. This is useful to retain chemical compatibility between the encapsulant and the bulk polymer while retaining the flexibility to tune the release profile.

The oil field chemical preferably has a melting point of less than 250° C. and may have a melting point in a range 100 to 250° C., i.e. a low melting point solid. It has been found that such low melting point solids are particularly compatible with the release systems as described herein. Furthermore, while the oil field chemicals encapsulated in this manner may be any known oil field chemical, according to certain applications the oil field chemical is a tracer compound such as an oil or water tracer.

Figure 5:
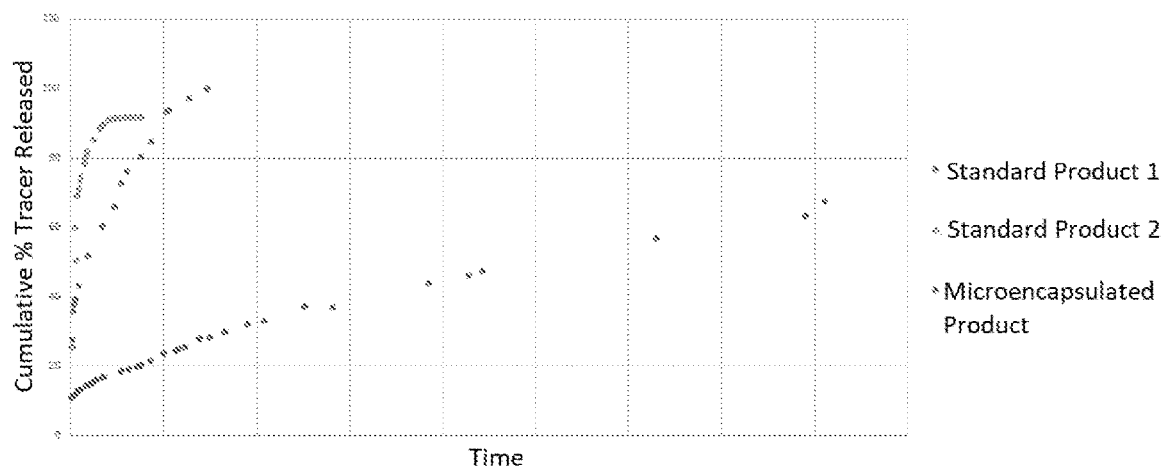
FIG. 5 shows a comparison of release rates (release profiles) from standard products in which oil field chemical is directly incorporated into a bulk polymer matrix and microencapsulated products in which oil field chemical is microencapsulated and then incorporated into a bulk poly matrix leading to a much longer release period while still eluting sufficient oil field chemical at a controlled rate to provide the required functional effect of the oil field chemical.

FIG. 5 shows a comparison of release rates (release profiles) from products in which oil field chemical is directly incorporated into a bulk polymer matrix and microencapsulated products in which oil field chemical is microencapsulated and then incorporated into a bulk polymer matrix. Results indicate a much longer release period for the microencapsulation and bulk polymer combination and this system still elutes sufficient oil field chemical at a controlled rate to provide the required functional effect of the oil field chemical. For example, in tracer applications the release rate is sufficient to meet limit of detection (LOD) requirements for typical tracer compounds. In this regard, the limit of detection for typical tracer compounds was previously approximately 10 ppb. However, over recent years limits of detection have improved through analytical method development and are now typically between 10 ppt and 1 ppb, i.e. between 10× and 1000× improvement in limit of detection. This improvement in the limit of detection of typical tracer compounds can be utilized in combination with the release systems of the present specification to provide a slow and controlled release of tracer which is detectable and quantifiable over very long time periods. The ideal release rate is a compromise between working life and limit of detection.

Figure 6:
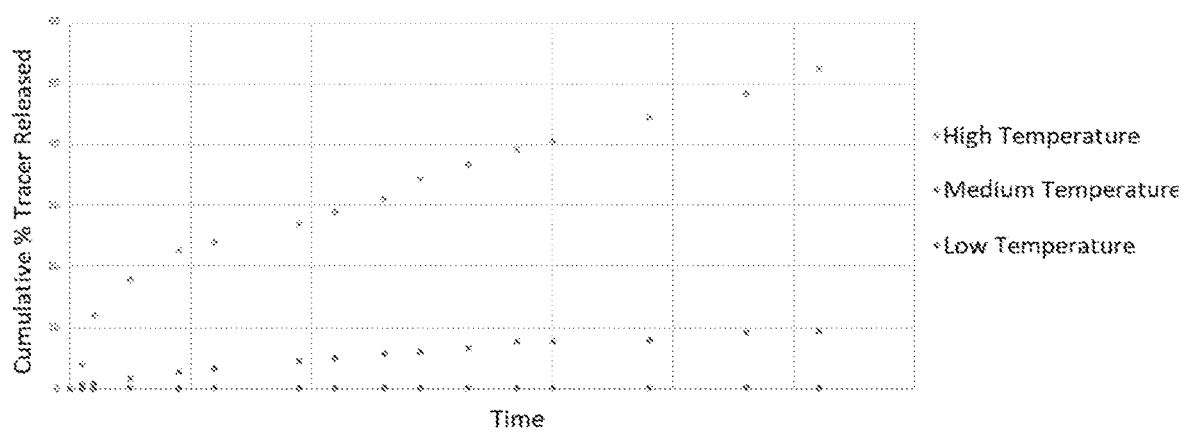
FIG. 6 shows release profiles for the same microencapsulated—bulk polymer release system at three different temperatures indicating that release rates are significantly impacted by temperature.
Figure 7:
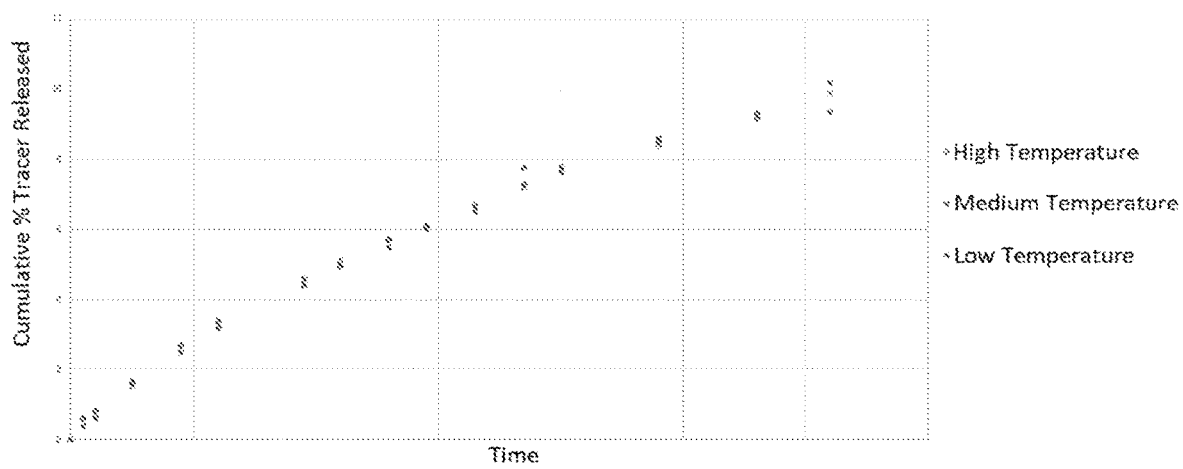
FIG. 7 shows release profiles for three different microencapsulated—bulk polymer release systems at three different temperatures, where the bulk polymer composition of each system has been tuned to exhibit the same release profile despite the products being tested at different temperatures.

FIG. 6 shows release profiles for the same microencapsulated—bulk polymer release system at three different temperatures indicating that release rates are significantly impacted by temperature. As such, it has been realized that the microencapsulated—bulk polymer release systems should be optimized for use at different temperatures according to end use requirements. In this regard, operating temperatures depend on the type of hydrocarbon reservoir and/or the location of the release system within a hydrocarbon reservoir. Typical operating temperatures have been identified as being 60, 90, and 120° C. Taking into account typical loadings for encapsulated oil field chemicals in a bulk polymer and typical limits of detections now achievable, the microencapsulated—bulk polymer release systems have been configured to provide a release rate in a range 0.01 to 8.3 wt % per month for a time period of at least 1 year at each of these temperatures. In this regard, FIG. 7 shows release profiles for three different microencapsulated—bulk polymer release system at three different temperatures, where the bulk polymer composition of each system has been tuned to exhibit the same release profile despite the products being tested at different temperatures. These three products comprise the same tracer compound and same polymer microencapsulant. The bulk polymer matrix is composed of an epoxy resin system (as described in the examples) comprising two different monomers, the ratio of which are varied to tune the release profile at each temperature. Results show that using a microencapsulated oil field chemical it is possible to tune the composition of a surrounding bulk polymer matrix in order to achieve the desired release profile at the specified temperatures. The results also show that a set of oil field chemical release systems has been provided, one configured to provide the required release profile at 60° C., another to provide the required release profile at 90° C., and another to provide the required release profile at 120° C. The release systems can be provided in the form of controlled release tracer rods.

EXAMPLES

Example 1—Preparation of Microcapsules Containing a Tracer

An ethylene-maleic anhydride alternating copolymer was mixed with deionised water and sodium hydroxide solution and heated to to a temperature between 50 and 100° C. After stirring for between 1 and 5 hours, a clear solution was obtained. This solution was designated as EMA solution.

Tracer A (a solid haloaromatic compound, density >1.0 g/cm$^3$ at 25° C. and 1 atmosphere, melting point between 100 and 250° C.) was mixed with the above prepared EMA solution, water, formic acid, and homogenised. A resin, e.g. a reactive cross-linker resin such as a methylated melamine formaldehyde resin, was then added and the mixture was homogenised. The resultant aqueous mixture was cured. The mixture was further charged with urea and then heated at a temperature between 50 and 100° C. for a time period between 0.5 and 5 hour. The resultant dispersion was then cooled to room temperature, filtered, dried in air and then dried in a vacuum. The dried powder product containing the encapsulated tracer was then filtered. Total tracer content in the final powder product was 95.2%. The powder was dispersed in deionised water and tested for particle size using a Malvern Mastersizer (RTM) 2000 under 85% ultrasonication. The measured volume weighted mean particle size was 50 μm.

Example 2—Preparation of a Sustained Release System Containing Tracer A with a Single Epoxy Resin Monomer Microencapsulated oil tracer particles obtained from Example 1, a first epoxy resin monomer (a bisphenol diglycidyl ether) and a curing agent were combined and stirred to provide a homogeneous mixture. The mixture was cast in silicon moulds. The moulded composition was cured in an oven at a temperature between 50 and 100° C. for a time period between 1 and 5 hours and then the cured articles were removed from the moulds. The articles contained 55.1% by weight of Tracer A.

Example 3—Preparation of a Sustained Release System Containing Tracer A with Two Epoxy Resin Monomers (Ratio 9:1)

Microencapsulated oil tracer particles obtained from Example 1, the first epoxy resin monomer of Example 2, a second epoxy resin monomer (an ethyl hexyl glycidyl ether) and a curing agent were combined and stirred to provide a homogeneous mixture with a first to second epoxy resin monomer ratio of 9:1. The mixture was cast in silicon moulds. The moulded composition was cured in an oven at a temperature between 50 and 100° C. for a time period between 1 and 5 hours and then the cured articles were removed from the moulds. The articles contained 55.1% by weight of Tracer A.

Example 4—Preparation of a Sustained Release System Containing Tracer A with Two Epoxy Resin Monomers (Ratio 8.5:1.5)

Microencapsulated oil tracer particles obtained from Example 1, the first epoxy resin monomer of Example 2, the second epoxy resin monomer of Example 3 and acuring agent were combined and stirred to provide a homogeneous mixture with a first to second epoxy resin monomer ratio of 8.5:1.5. The mixture was cast in silicon moulds. The moulded composition was cured in an oven at a temperature between 50 and 100° C. for a time period between 1 and 5 hours and the cured articles were then removed from the moulds. The articles contained 55.1% by weight of Tracer A.

Example 5—Preparation of a Sustained Release System Containing Tracer A with Two Epoxy Resin Monomers (Ratio 7.5:2.5)

Microencapsulated oil tracer particles obtained from Example 1, the first epoxy resin monomer of Example 2, the second epoxy resin monomer of Example 3 and a curing agent were combined and stirred to provide a homogeneous mixture with a first to second epoxy resin monomer ratio of 7.5:2.5. The mixture was cast in silicon moulds. The moulded composition was cured in an oven at a temperature between 50 and 100° C. for a time period between 1 and 5 hours and then the cured articles were removed from the moulds. The articles contained 55.1% by weight of Tracer A.

Example 6—Preparation of a Sustained Release System Containing Tracer A with Two Epoxy Resin Monomers (Ratio 7:3)

Microencapsulated oil tracer particles obtained from Example 1, the first epoxy resin monomer of Example 2, the second epoxy resin monomer of Example 3 and a curing agent were combined and stirred to provide a homogeneous mixture with a first to second epoxy resin monomer ratio of 7:3. The mixture was cast in silicon moulds. The moulded composition was cured in an oven at a temperature between 50 and 100° C. for a time period between 1 and 5 hoursand then the cured articles were removed from the moulds. The articles contained 55.1% by weight of Tracer A.

Example 7—Release Testing of Sustained Release Systems in a Synthetic Oil at 90° C.

A synthetic oil composed of 80% Transulate transformer oil (Smith & Allan) and 20% Dowtherm Q oil (Dow) was used as a model crude oil to test the release performance of the sustained release system samples containing Tracer A prepared in Examples 2 to 6.

Each of the sustained release systems was weighed and suspended in a glass bottle containing 200 mL of the above-mentioned synthetic oil. The synthetic oil in each bottle was heated and stirred at a temperature of 90° C.

Samples (0.5 mL) of the oil were periodically taken from the bottles. The samples were diluted, if necessary, and analysed using GC-MS or GC-ECD to determine the amount of Tracer A. In order to maintain the total amount of oil in the test bottles, 0.5 mL of fresh oil was injected into the test bottles each time after a sample was taken. Periodically, all the oil inside each test bottle was replaced with fresh oil.

The cumulative total of Tracer A released from each sustained release system was calculated, taking into account any replacements of oil during the test period. Since the amount of Tracer A in the release systems prior to testing was known, then the release profile could be calculated as a weight percentage of the initial Tracer A content of each of the sustained release systems.

Example 8—Release Testing of Sustained Release Systems in a Synthetic Oil at 60° C.

Sustained release system samples containing Tracer A prepared in Example 5 were tested in the synthetic oil described in Example 7 at 60° C. In each test, a sample made in Example 5 was weighed and suspended in a glass bottle containing 200 mL of the above-mentioned synthetic oil. The synthetic oil was heated and stirred at a temperature of 60° C. The procedures for taking samples, changing oil, analysing, and processing data for release profiling were the same as those described in Example 7.

Example 9—Release Testing of Sustained Release Systems in a Synthetic Oil at 120° C.

Sustained release system samples containing Tracer A prepared in Example 5 were tested in the synthetic oil described in Example 7 at 120° C. In each test, a sample made in Example 5 was weighed and suspended in a sealed reactor containing 200 mL of the above-mentioned synthetic oil. The reactor was placed in an oven at a temperature of 120° C. Samples were taken regularly from the reactor. To take samples, the reactor was cooled to room temperature before the reactor was opened. 0.5 mL samples of the oil were periodically taken from the reactor. The procedures for taking samples, changing oil, analysing, and processing data for release profiling were the same as those described in Example 7. However, any operation time when the reactor was below 120° C. was excluded.

Results

Figure 8:
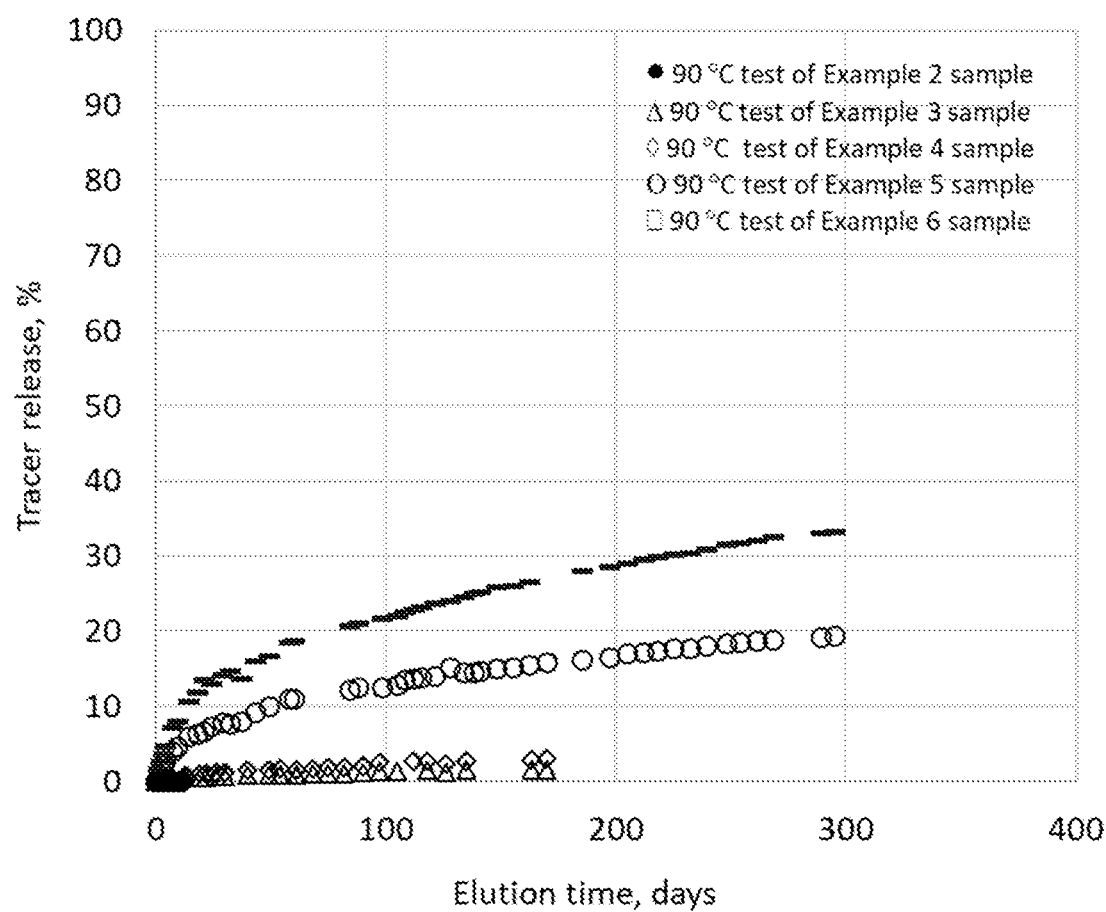
FIG. 8 shows release profiles for several different release systems at 90° C. indicating how variations in bulk polymer composition can be used to tune release rates for the same microencapsulated oil field chemical.

FIG. 8 shows release profiles of Tracer A at 90° C. produced according to Example 7 from the multi-component epoxy resin systems as prepared in Examples 2-6. Results show that tracer release rate is dependent on the level (ratio) of epoxy resin monomers in the system. However, all Examples showed a slow and controlled release profile over a long time period with less than 40% of the tracer being released after 300 days in all cases. The results indicate how variations in bulk polymer composition can be used to tune release rates for the same microencapsulated oil field chemical.

Figure 9:
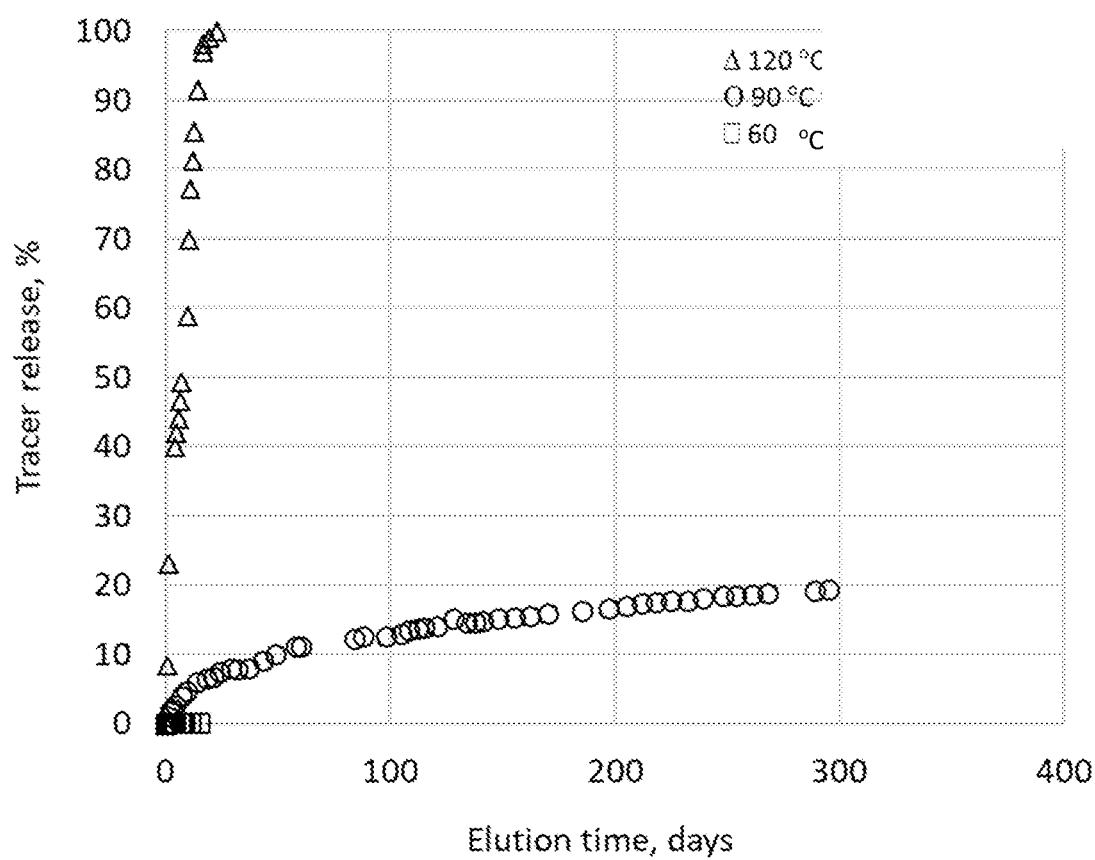
FIG. 9 shows release profiles for several different release systems at three different temperatures indicating that the release system should be selected and optimized for the temperature in the reservoir.

FIG. 9 shows release profiles of Tracer A produced according to Examples 7 to 9 from the multi component epoxy resin tracer system as prepared in Example 5 at three different temperatures: 60° C.; 90° C.; and 120° C. The results indicate that the release profile of a release system of this kind is significantly changed by temperature changes, and that the release system should be selected and optimized for the operating temperature in the reservoir. As indicated in FIG. 7, it has been found to be possible to tune the composition of the bulk polymer by varying the ratio of epoxy resin monomers to achieve the desired release profile at these three different temperatures.

The Value of Microencapsulation to Inflow Tracer Studies

Though non-radioactive tracers come in a variety of different forms, a common application is the use of polymer tracer rods to quantify the inflow production profile of a well. This type of tracer study is achieved by casting a phase-specific tracer (e.g., oil, gas, or water) within a polymer matrix, usually with the shape of a bar or rod. Once the carrier polymer hardens around the chemical tracer, the cast polymer tracer rods can be cut and shaped to size and installed into the well completion, typically within the drainage layer of a sand control screen. When the completion is run in-hole, the polymer tracer rods begin to elute their unique chemical marker upon contact with their corresponding fluid phase. A typical well, before being brought online, is usually in contact with oil along the wellbore and continues to contact oil over the lifetime of the well, allowing the oil polymer tracer rods to elute their oil marker. When water breakthrough occurs, installed water polymer tracer rods begin to elute their water markers. By capturing samples of the produced fluids at surface at different time intervals, it becomes possible to measure the concentration of each unique chemical marker and quantify where along the wellbore and at what rate the different fluid phases are being produced.

As a diagnostic method to understand fluid production and how a wellbore is interacting with the reservoir, these polymer tracer bars are an exceptional tool. They benefit from being low-cost, being a completely passive system, not requiring the installation of secondary tool systems, wires, or cables, and being able to avoid restricting the inner diameter of the well. However, they suffer from a significant limitation in effective life; installed within the drainage layer of sand control screens, there is a limited working space to place tracers and once the implanted tracer is consumed, there is no mechanism to replace or replenish the installed polymer bars. For this reason, traditional tracer bars rarely exceed a working life of two to three years under real world conditions, a significant barrier to long-term studies of wellbore performance.

Novel microencapsulated polymer tracer bars overcome this hurdle. By creating a distribution of microparticles with different cell wall thicknesses, this manufacturing technique overcomes the limitations of traditional tracer rods with their rapid matrix diffusion rates and instead prolongs tracer release. Unlike their traditional counterparts, a microencapsulated tracer rod can allow a controlled and sustained release of portions of the enclosed tracer to diffuse out of the rod when contacting the markable phase. In optimizing this release response, microencapsulated tracers can provide threefold improvement or more in working life over current inflow tracers, constrained only by the limited of detection of the tracer itself.

Long-Term Laboratory Testing of Microencapsulated Tracers

Figure 10:
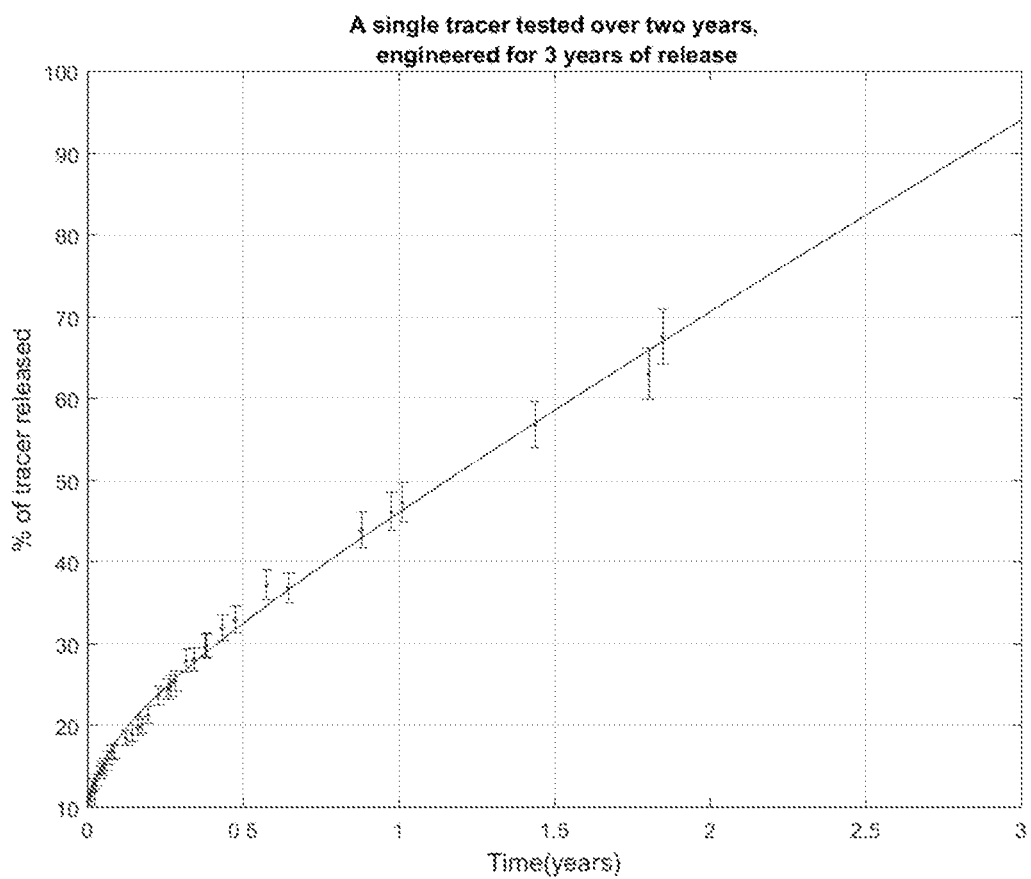
FIG. 10 shows two years of elution data for a polymer tracer rod comprising microcapsules of tracer within a bulk polymer matrix.
Figure 11:
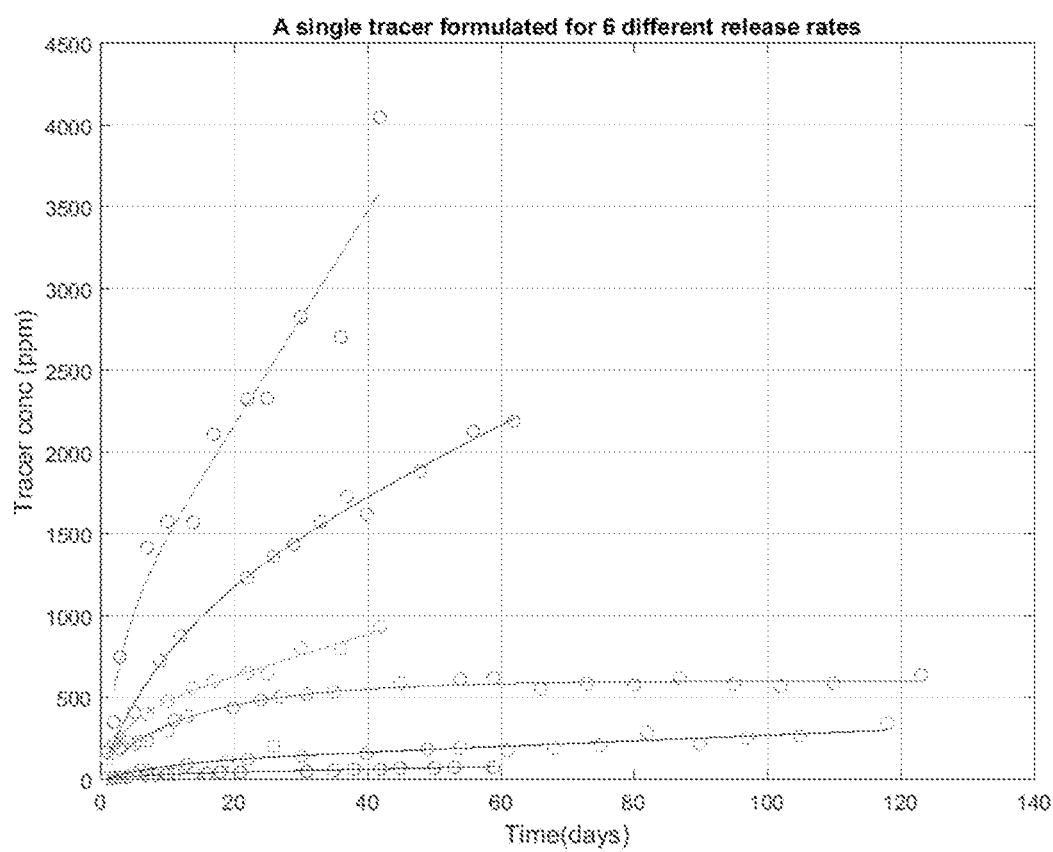
FIG. 11 shows elution data for the same tracer in six different microencapsulated—bulk polymer release systems indicating that the microencapsulation process can be customized to achieve different tracer release rates.

Synthesis methodology has been developed as described herein to encapsulate a suite of oilfield tracers. For the suite of commercial tracer offerings, a microencapsulated polymer product can be tuned to elute tracers at any rate between 0.001 to 10 mg/cm$^2$/day. By having a tunable release rate, the microencapsulated polymer tracer rods can be adapted to meet any client demand from initial production confirmation and quantification to long term monitoring of reservoir dynamics. For certain applications, a release profile has been developed which has a large initial release of tracer, followed by a lower steady-state release that is ideal for quantifying inflow production profiles. For certain other applications, a release profile has been developed which maintains a consistent linear release rate over the entirety of the polymer tracer rod life. In FIG. 10, two years of elution test data is provided for a microencapsulated polymer tracer rod designed for a three-year lifespan. Unlike a traditional polymer rod, a microencapsulated polymer tracer rod has an observable linear release over its extended lifetime. This rate of release can be modified for tracer studies ranging from 2 months to decades, always with a repeatable, consistent and linear release. In FIG. 11, the same tracer was reformulated in different microcapsule/bulk polymer systems for different desired study lifetimes. Though the tracer release rate proved adjustable, the consistent linear release rate was preserved.

The consistent linear release of tracer allows for the microencapsulated product to achieve working lifetimes not seen within the industry until now. Consider a typical polymer tracer rod deployment within a well producing 5000 bbls of fluid a day with a reservoir temperature of 60° C. Depending on the analytical limits of detection for the chemical tracer, lab testing thus far indicates that a microencapsulated tracer can produce a measurable signal over decades of well life rather than months or years. In the development of this product, effective microencapsulated tracer compositions have been created for wells ranging in temperature from 60° to 120° C. with the same consistent, repeatable tracer performance.

| Targeted tracer concentration, ppb | Required tracer release rate, mg/cm$^2$/day | Expected release life, years |
|---|---|---|
| 1 | 0.01 | 35.9 |
| 5 | 0.05 | 7.2 |
| 10 | 0.10 | 3.59 |
| 20 | 0.21 | 1.8 |
| 50 | 0.53 | 0.7 |

Microencapsulated tracers are a potentially disruptive technology to traditional well inflow diagnostics. Maintaining all the advantages of tracer studies to date, including low-cost, the lack of well intervention, and operational simplicity, microencapsulated polymer tracer rods take a technology proven outside of the oilfield and achieves new limits to the lifespan of tracer studies. By controlling the distribution of microparticle sizes and rate of tracer release, microencapsulated tracers provide a customizable solution to reservoir diagnostics.

CONCLUSIONS

The present specification provides temperature responsive multi-component polymer formulations for sustained release of oil field chemicals for monitoring or treatment of reservoirs having different conditions. A temperature dependent oil field chemical controlled release system is provided in which oil field chemical, such as chemical tracer, is contained within an either physically blended or chemically bonded multi-component polymer system. The properties of the system can be adjusted by varying the composition of the multi-component polymer system. In the examples described herein, the oil field chemicals are microencapsulated before they are incorporated and dispersed in the polymer system. The structure of the whole oil field chemical composite system is optimised such that the system shows temperature dependent controlled release behaviour. The loading of oil field chemicals in the microcapsules or shell thickness of the microcapsules can be varied in addition to the surrounding bulk polymer matrix composition to achieve the desired release behaviour.

As a result of the formulation of the multi-components in the polymer system, in terms of function, the composition is responsive to a change in temperature. That is, the rate for the oil field chemical to release from the system is temperature dependent. At a target temperature, a particular system produces sustained release of oil field chemicals at detectable and/or effective concentration over a long period of time. This targeted temperature can be adjusted by varying the composition of the multi-component polymer system. At temperatures well below the targeted temperature, the system releases oil field chemicals too slowly to be well detected and/or effective enough. At temperatures well above the targeted temperature, the release of oil field chemicals is too fast and results in short release life.

It is well known that the condition of a reservoir varies from field to field, depending on depth and location around the world. For example, the temperature of the reservoir can range from −45 to 300° C., more usually 20 to 200° C., with typical temperatures ranging from 60 to 120° C. The release rate of the oil field chemical delivery system will be affected by the reservoir condition, particularly temperature. For effective well/reservoir treatment or monitoring, it is necessary to design oil field chemical release systems according to the conditions of the reservoirs in which they are to be used. The present specification provides a way to design such systems.

The systems as described herein are particularly useful for providing hydrocarbon reservoir characterisation and monitoring services using chemical tracers. Near well bore inflow monitoring uses tracers released from the tracer systems deployed along the well bore to provide production monitoring. Sustained tracer release is a key customer demand. Longer term release and monitoring, ideally over the entire lifetime of a well, is desired. In addition to tracers, during the life of a hydrocarbon reservoir other chemicals are often required to be introduced to the reservoir or its wells to provide treatment and production improvement. In many cases sustained and/or controlled release of the chemicals is preferred in order to achieve efficiency and effectivity over a long period of time. The technology disclosed in this specification provides temperature graded products to serve the customer according to the conditions of the customer reservoir.

According to certain examples, the release system comprises a physically blended or chemically bonded multicomponent system. In the physically blended system, two or more polymers are present and there is no chemical bonding between the polymers. In a chemically bonded system, the polymer is formed by at least two different starting components. A final system is formed through a formation process during which chemical bonding occurs between the starting components. An example of a chemically bonded system is a multicomponent epoxy resin. An epoxy resin polymer system usually comprises at least one epoxy resin monomer and at least one curing agent. At least one of the epoxy resin monomers may contain two epoxy chemical groups in its chemical structure. In a formation process, the epoxy resin monomer and the curing agent are mixed and the polymerisation of the epoxy resin monomer occurs with the catalysis and/or the participation of the curing agent at elevated temperature and/or over a period of time. In examples according to the present specification, more than one type of epoxy resin monomer is used. One of the epoxy resin monomers may contain two epoxy groups. The remaining epoxy resin monomers may contain one, two, or more than two epoxy groups in their molecular structures. The ratio of the epoxy resin monomers in the system can be adjusted to adjust the temperature at which the oil field chemical can be released effectively and sustainably. The invention is exampled by a microencapsulated tracer/multi component epoxy resin system.

The systems described herein comprise at least one oil field chemical. The oil field chemical is incorporated to the system during the formation process. The oil field chemical is not chemically bonded to the polymer or polymers within the system. It is preferred that the oil field chemical is microencapsulated into microcapsule particles first before it is incorporated into the polymer systems. Microencapsulation has been found to provide a number of advantages including: better controlled release of oil field chemical; longer working lifetimes; reduced initial oil field chemical release; temperature optimised release profiles; and greater oil field chemical loading. That said, it is also envisaged that for certain applications, particularly those which do not require such a long release time, the multi-component bulk polymer systems as described herein may be used in conjunction with non-encapsulated oil field chemicals. In these systems, the ratio of monomers and/or polymers in a multicomponent system can be tuned to provide the desired release profile and a particular target temperature. However, the release profile for non-encapsulated oil field chemicals introduced into such a multi-component bulk polymer system will generally be much shorter than for systems which combine microencapsulation with a bulk polymer system.

While this invention has been particularly shown and described with reference to certain examples, it will be understood to those skilled in the art that various changes in form and detail may be made without departing from the scope of the invention as defined by the appended claims.

The invention claimed is:

1. An oil field chemical release system for controlled release of an oil field chemical within a hydrocarbon reservoir, well, or wellbore, the oil field chemical release system comprising:
 a plurality of microcapsules, each microcapsule comprising an oil field chemical and a microencapsulant, wherein the oil field chemical is contained within the microencapsulant; and
 a continuous bulk polymer matrix, wherein the plurality of microcapsules are disposed within the continuous bulk polymer matrix,
 wherein the oil field chemical release system is configured to allow the oil field chemical to move through the microencapsulant into the continuous bulk polymer matrix and through the continuous bulk polymer matrix to be released through a surface of the bulk polymer matrix into the hydrocarbon reservoir, well, or wellbore at a controlled rate,
 wherein the oil field chemical release system is configured to provide a release profile, calculated as a weight percentage of an initial oil field chemical content of the chemical release system, in a range 0.01 to 8.3 wt % per month for a time period of at least 1 year at a target temperature in a range −45° C. to 300° C.,
 wherein the continuous bulk polymer matrix is an epoxy resin system comprising at least two different epoxy monomers which are chemically bonded to form a co-polymer,
 wherein the microencapsulant comprises a co-polymer formed of at least two different monomers which are chemically bonded to form the co-polymer, and
 wherein the at least two different epoxy monomers in the epoxy resin system comprise at least two different epoxy ether monomers.

2. The oil field chemical release system according to claim 1, wherein the release profile of the oil field chemical is in a range 0.01 to 4.2 wt % per month for a time period of at least 2 years.

3. The oil field chemical release system according to claim 1, wherein the release profile of the oil field chemical is in a range 0.01 to 2.8 wt % per month for a time period of at least 3 years.

4. The oil field chemical release system according to claim 1, wherein the release profile of the oil field chemical is in a range 0.01 to 1.7 wt % per month for a time period of at least 5 years.

5. The oil field chemical release system according to claim 1, wherein the release profile of the oil field chemical is in a range 0.01 to 1.2 wt % per month for a time period of at least 7 years.

6. The oil field chemical release system according to claim 1, wherein the release profile of the oil field chemical is in a range 0.01 to 0.8 wt % per month for a time period of at least 10 years.

7. The oil field chemical release system according claim 1, wherein the release profile of the oil field chemical is at least 0.05, 0.1, 0.2, 0.5, 0.7, or 0.8 wt % per month.

8. The oil field chemical release system according to claim 1, wherein the target temperature is in a range 0° C. to 250° C., 20° C. to 200° C., 50° C. to 150° C., 60° C. to 120° C., or one of 60° C., 90° C., or 120° C.

9. The oil field chemical release system according to claim 1, wherein the epoxy resin system further comprises a curing or cross-linking agent.

10. The oil field chemical release system according to claim 1, wherein the microcapsules have a diameter of from 50 nm to 2 mm.

11. The oil field chemical release system according to claim 1, wherein the oil field chemical is a tracer.

12. The oil field chemical release system according to claim 1, wherein the oil field chemical has a melting point of less than 250° C.

13. The oil field chemical release system according to claim 1, wherein the oil field chemical has a melting point in a range 100 to 250° C.

14. Use of the oil field chemical release system according to claim 1 to release an oil field chemical within a hydrocarbon reservoir, well, or wellbore.

15. A set of oil field chemical release systems according to claim 1, wherein one of the oil field chemical release systems is configured to provide the release profile at a first target temperature and another of the oil field chemical release systems is configured to provide the release profile at second target temperature which is different to the first target temperature.

16. The set of oil field chemical release systems according to claim 15, comprising at least three oil field chemical release systems, one configured to provide the release profile at 60° C., another to provide the release profile at 90° C., and another to provide the release profile at 120° C.

17. The oil field chemical release system of claim 1, wherein one epoxy monomer of the at least two different epoxy monomers contains two epoxy groups and a second epoxy monomer contains one epoxy group.

* * * * *